(12) United States Patent  
Cao et al.

(10) Patent No.: US 7,020,569 B2  
(45) Date of Patent: Mar. 28, 2006

(54) INTELLIGENT MODELLING OF PROCESS AND TOOL HEALTH

(75) Inventors: An Cao, Arlington, MA (US); Wai T. Chan, Newburyport, MA (US); Jill P. Card, West Newbury, MA (US)

(73) Assignee: Ibex Process Technology, Inc., Lowell, MA (US)

( * ) Notice: Subject to any disclaimer, the term of this patent is extended or adjusted under 35 U.S.C. 154(b) by 46 days.

(21) Appl. No.: 10/801,064

(22) Filed: Mar. 15, 2004

(65) Prior Publication Data

US 2004/0199362 A1 Oct. 7, 2004

Related U.S. Application Data

(60) Provisional application No. 60/454,424, filed on Mar. 13, 2003.

(51) Int. Cl.
   *G06F 19/00* (2006.01)
(52) U.S. Cl. .......................................... 702/108; 714/25
(58) Field of Classification Search ............ 702/57–59, 702/182–185, 188, 189, 108; 714/25; 706/15, 706/21

See application file for complete search history.

(56) References Cited

U.S. PATENT DOCUMENTS

| | | | |
|---|---|---|---|
| 5,467,883 A | 11/1995 | Frye et al. ..................... 216/60 |
| 5,559,690 A | 9/1996 | Keeler et al. ................ 364/164 |
| 5,654,903 A | 8/1997 | Reitman et al. ....... 364/551.01 |
| 5,740,033 A | 4/1998 | Wassick et al. ............. 364/149 |
| 6,199,018 B1 * | 3/2001 | Quist et al. ................... 702/34 |
| 6,268,226 B1 | 7/2001 | Angell et al. ................. 438/16 |
| 6,651,012 B1 * | 11/2003 | Bechhoefer ................... 702/34 |
| 6,826,683 B1 * | 11/2004 | Suermondt et al. ......... 713/100 |

FOREIGN PATENT DOCUMENTS

DE 196 37 917 A1 3/1998
WO WO 01/57605 8/2001

OTHER PUBLICATIONS

Card et al., "Dynamic Neural Control for Plasma Etch Process," *IEEE Transactions on Neural Networks*, (1997).
Card et al., "Impacts of Maintenance Input on the Prediction Accuracy of an APC Controller," Presentation at AEC/APC Symposium XIV (Sep. 9-11, 2002).
Card et al., "Advanced Analysis of Dynamic Neural Control Advisories for Process Optimization and Parts Maintenance," Presentation at AEC/APC Symposium XIV (Sep. 9-11, 2002).
Dillon et al., "Guest Editorial Everyday Applications of Neural Networks," *IEEE Transactions on Neural Networks*, 8:4 (Jul. 1997).
Hatzipantelis et al., "Comparing Hidden Markov Models with Artificial Neural Network Architectures for Condition Monitoring Applications," *Artificial Neural Networks*, 26-28, Conference Publication No. 409 (Jun. 1995).

(Continued)

*Primary Examiner*—Edward Raymond

(57) ABSTRACT

The health of a tool is predicted based on temporally ordered input data representing parameters indicative of tool health. A sliding time window is used to partition input data into temporally displaced data sets. Non-linear regression models determine, based on the data sets, a set of predictive values relating to tool health at a future time. A tool-health metric is then determined based on one or more of the predictive values.

21 Claims, 5 Drawing Sheets

OTHER PUBLICATIONS

Kim et al., "Intelligent Control of Via Formation by Photosensitive BCB for MCM-L/D Applications," *IEEE Transactions on Semiconductor Manufacturing*, 12:503 (1999).

Konstantopoulos et al., "Controllers with Diagnostic Capabilities. A Neural Network Implementation. Journal of Intelligent and Robotic Systems," Department of Electrical Engineering, University of Notre Dame, IN 12: 197-228 (1995).

Moyne, "AEC/APC Vision: A Research and Suppliers' Point of View," 3rd Annual European AEC/APC Conference Proceedings (2002).

Rietman et al., "A Study on $R^m \rightarrow R^1$ Maps: Application to a 0.16- μm Via Etch Process Endpoint," *IEEE* (2000).

Rietman et al., "A System Model for Feedback Control and Analysis of Yield: A Multistep Process Model of Effective Gate Length, Poly Line Width, and IV Parameters", *IEEE* (2001).

Rietman, "*Neural Networks in Plama Processing,*" *Journal of Vacuum Science and Technology: Part B, IEEE Transactions on Semiconductor Manufacturing*, 14:1 (2001).

Smyth et. al., "Hidden Markov Models an Neural Networks for Fault detection in Dynamic Systems," California Institute of Technology (1993).

Zhang et al, "Control of Spatial Uniformity in Microelectronics Manufacturing: An Integrated Approach," Proceedings of AEC/APC (2000).

\* cited by examiner

INTELLIGENT MODELLING OF PROCESS AND TOOL HEALTH

CROSS REFERENCE TO RELATED APPLICATIONS

The present application claims the benefit of and priority to U.S. provisional application Ser. No. 60/454,424, filed Mar. 13, 2003, the entire disclosure of which is herein incorporated by reference.

FIELD OF THE INVENTION

The invention relates generally to the field of data processing and process control and, in particular, to nonlinear regression fault prediction of complex tools and processes.

BACKGROUND

Complex tools and processes may be prone to failure because of the numerous environmental and internal factors that affect performance. Failure includes both deviations (i.e., the tool or process operates using parameters outside their acceptable ranges) and shutdowns caused by, for example, mechanical failure or extreme deviations from acceptable process parameters. Often, there can be a substantial cost associated with the failure of complex tools or processes. Examples of failure related costs include operational downtime, equipment repair and servicing, and the like.

One approach to minimizing unexpected failure is to institute a program of periodic replacement, i.e., replacing tools or process systems when they are statistically expected to fail. While this approach may reduce unexpected failures, it cannot eliminate them, since periodic replacement is based on an average for all tools, not the characteristics and health of individual tools. For the same reason, overall operating costs may actually increase as good tools are needlessly replaced while unexpected failures continue to occur.

Traditionally, methods for predicting failures of complex tools and processes have focused on using time-series data collected for individual tools and using that data to predict the failure of each tool independently. Such traditional solutions are less than ideal because they produce individual models for each tool. Therefore, no generic model is available to predict failures across multiple tools, and a new model must be built for each new tool.

What is needed, therefore, is an approach by which an approaching tool failure is identified prior to its occurrence, i.e., advance failure prediction, using a generic model that can be applied to individual tools.

Cryogenic pump installations exemplify systems that employ multiple tools having similar failure profiles. During normal operation in such installations, cryogenic pumps measure and regulate temperature. Each pump may sense or experience dozens of conditions affecting the operation of the pump. In addition, numerous pumps are employed at any given installation. As a result, advance failure prediction of an individual pump at any given time is difficult, yet unexpected failure of a pump can cause disruption and increase operating costs.

SUMMARY OF THE INVENTION

In accordance with the present invention, failure prediction is utilized to accurately identify precursors to failure before failure occurs. As a result, predictions and tool health indicators based on precursor identification can provide a process operator or process control system with advance warning to preemptively replace the tool, thus avoiding a tool failure. The present invention provides methods for predicting tool failure based on time-series input data. The input data specify parameters that relate directly (e.g., based on known tool characteristics or vulnerabilities) or indirectly (e.g., empirically or statistically) to the health of the tool.

As used herein, "input data" refers to data representing any parameter used to measure the health or state of a tool. In some embodiments, input data may include parameters determined during the operation of the tool and/or during routine maintenance of the tool. As used herein, "operational data" includes data that indicates the current state of the tool or its environment. As used herein, the term "maintenance data" is used to refer to characteristics of the tool during previous regeneration procedures performed on the tool, and to characteristics of the regeneration process itself. In some embodiments, input data values may be one or more of measured values, normalized values, and statistical data derived from measured or calculated values (such as an average of a value over time). In some embodiments, a value may be derived from a time segment of historical information or a sliding window of state information regarding the input data.

In one aspect, the invention comprises a method of predicting the health of a tool based on temporally ordered input data representing parameters indicative of tool health, comprising using a sliding time window to partition input data into temporally displaced data sets; using non-linear regression to determine, based on the data sets, a set of predictive values relating to tool health at a future time; and determining a tool-health metric (e.g., likelihood of tool failure) based on one or more of the predictive values. As used herein, the term "tool" broadly refers to any operative piece of equipment or subassembly or portion thereof, or to a process.

In some embodiments, the data sets include discrete representations of continuous input data, and in some embodiments the non-linear regression models are neural network models, and in some embodiments may include Fourier coefficients, and in some embodiments may include wavelet coefficients.

In some embodiments, the input data may be split into different modules representing various characteristics (i.e., single parameters or groups of parameters), and intermediate neural networks may be built for each module. An overseer module may use the output from the component networks as input, producing the predicted tool health as output, which in some embodiments can be smoothed using a moving average.

In another aspect of the invention a system for predicting the health of a tool based on temporally ordered input data representing parameters of tool health comprises a data module for receiving the input data, and an analysis module for partitioning the input data into temporally displaced datasets, using non-linear regression to determine a set of predictive values relating to tool health at a future time (e.g., likelihood of tool failure), and determining a tool-health metric based on the predicted values.

In some embodiments, the datasets include only historical data. In some embodiments, the datasets include discrete representations of continuous data, and may include one or more of Fourier coefficients, wavelet coefficients, operational data, and maintenance data. In some embodiments, the analyzer further creates intermediate neural networks for analyzing subsets of the data in the datasets. In yet another aspect, the analyzer creates an overseer network which accepts as input the output from the intermediate networks, and produces one or more tool health metrics as output. The analyzer may also use moving average smoothing techniques to smooth the output of the overseer network.

In another aspect, the invention comprises an article of manufacture having a computer-readable medium with the computer-readable instructions embodied thereon for performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM. The functionality of the method may be embedded on the computer-readable medium in any number of computer-readable instructions, or languages such as, for example, java, FORTRAN, PASCAL, C, C++, C#, Tcl, BASIC and assembly language. Further, the computer-readable instructions can, for example, be written in a script, macro, or functionally embedded in commercially available software (such as, e.g., EXCEL or VISUAL BASIC).

The foregoing and other objects, aspects, features, and advantages of the invention will become more apparent from the following description and from the claims.

BRIEF DESCRIPTION OF THE FIGURES

A fuller understanding of the advantages, nature and objects of the invention may be had by reference to the following illustrative description, when taken in conjunction with the accompanying drawings. The drawings are not necessarily drawn to scale, and like reference numerals refer to the same items throughout the different views.

DETAILED DESCRIPTION

Figure 1:
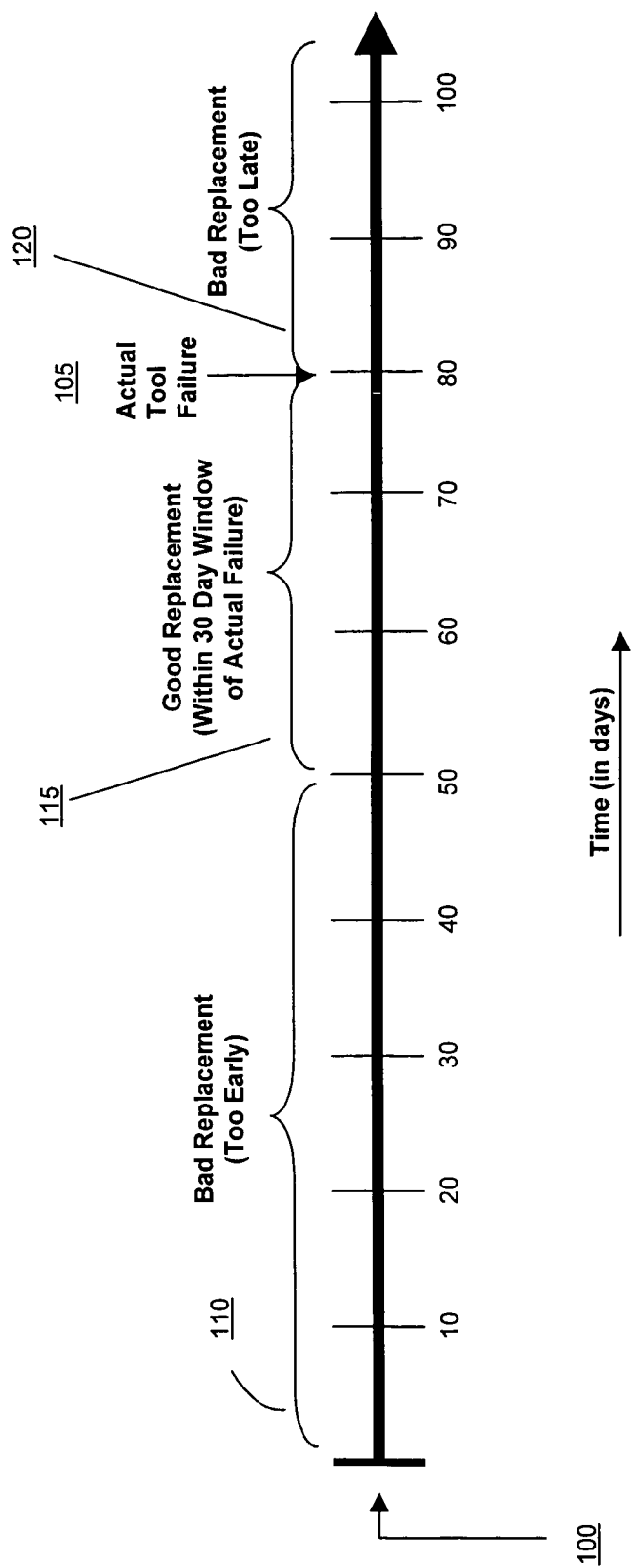
FIG. 1 is a timeline illustrating various embodiments of prediction of tool health according to the present invention.

FIG. 1 illustrates a timeline 100 starting at day 0 and continuing out 100 days. The timeline 100 describes the periods preceding and following an actual failure of a tool such as a cryogenic pump operating within a manufacturing process. However, it is to be understood that the present invention may be applied to predicting the health of virtually any tool or process. In one illustrative example of the invention, the tool required actual replacement 105 due to failure at day 80, and the desired replacement window is defined as 30 days prior to actual failure 105. For example, a replacement 110 of the tool between day 0 and day 50, using these parameters, is defined as a bad replacement because the remaining operational lifetime of the tool is too long to warrant a replacement. Similarly, a replacement 120 of the tool after day 80, is considered a bad replacement because the replacement occurs after the tool fails, thus an unplanned interruption to the process is necessary. In contrast, if the parameters of the process are such that replacing a tool with a remaining operational lifetime of thirty days or less is considered economically justified, replacing the tool between day 51 and day 80 (as indicated at 115) is preferred. Thus, one embodiment of the invention uses a sliding scale window to predict tool failure thirty days in the future.

Figure 2:
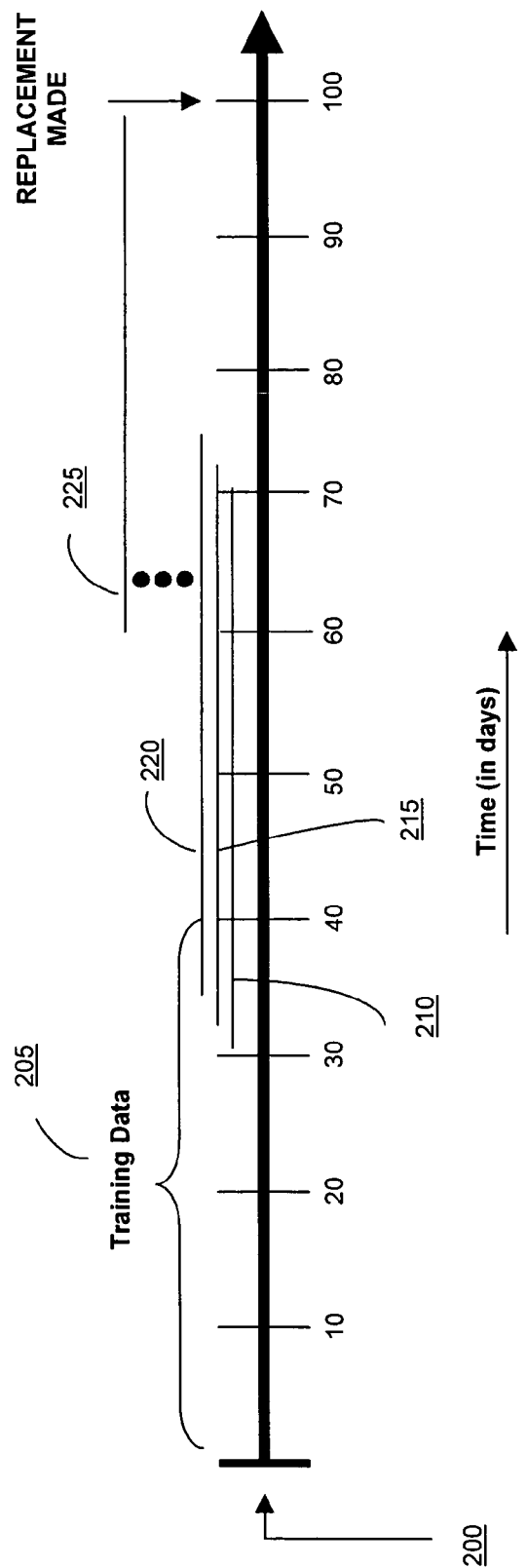
FIG. 2 is a flow diagram illustrating various embodiments of prediction of tool health according to the present invention.

Referring to FIG. 2, in one embodiment of the invention, historical data 205 and a sliding window is used to process the data samples from all of the tools in the data set. For example, operational and maintenance data collected during the period from day 0 through day 40 may be used as training data for a non-linear regression model, the output of which is tool health indicators at various times in the future. Using the model, observed tool health metrics can be used as input into the model. The observed too health metrics can include operational data for the last n days as input, and a pump health indicator 30 days ahead, or "forward in time" from the latest time in the sliding window, may be derived as output of the model.

In one embodiment of the invention, the window size n can be selected to meet computational or other constraints. Optimally, however, the sliding window should contain enough information to predict the tool health a certain number of days ahead without unnecessarily increasing the complexity of the model and thereby degrading its performance. Furthermore, the sliding window size should be selected such that historical data (i.e., data earlier in time to the start of the sliding window) has a minimal impact on the prediction results.

In some embodiments, input data can comprise operational and/or maintenance data. Operation data can include, for example, internal and/or external temperature readings, pressure readings, environmental characteristics, and the like. Maintenance data can comprise, for example, the time since the last regeneration, temperature readings at the last regeneration, the number of previous regenerations, and the like.

As one useful example of the embodiment described above, FIG. 2 illustrates a timeline 200 using a 40-day sliding window. This model can be used for prediction and can be applied to known data, with known outcomes, to produce a training set 205. Suppose, for example, that 100 days of input data exists for a particular pump, which is replaced on day 100. This replacement is deemed to be a good replacement, in that the replacement was necessary within the next 30 days. The first record 210 for this pump consists of the data from day 31 through day 70, a 40-day input window. The output for this record indicates that a replacement is necessary 30 days ahead, on day 100. The sliding window is then moved forward in time by one day to obtain the second input record 215, for day 32 through day 71. Similarly, the model predicts a replacement is necessary 30 days ahead, on day 101. In this example, tool health degradation occurs in a stable, consistent manner over time, allowing for data from days 31 through 70 to be included in the model; that is, if failure were assumed to be sudden, then a 30-day window could predict failure only once, i.e., on day 71, whereas the assumption that replacement is appropriate within a 30-day time period means that data from days 31 through 70 is predictively useful as well. In all, a total of 30 training records can be developed for this pump; the last record 225 spans day 60 through day 99, with the same desired output of a pump replacement in 30 days.

Input records can also be generated from pumps that are deemed to have been unnecessarily replaced. For example, using a 40-day window and a 30-day forward projection that ends before the replacement date of the pump, subsequent records can be generated by moving the sliding window back in time by 10 days, for which the desired output is that a replacement will not be necessary in 30 days.

If the time-series data is continuous, it may be desirable to represent it discretely in order to perform regression analysis. For example, a Fourier transform portrays a time-varying signal as a superposition of simple sinusoids with different frequencies, and the Fourier coefficients measure the contributions of these different frequencies to the original signal. Accordingly, the original signal can be fully reconstructed from sinusoidal signals by summing them in accordance with the amplitudes specified by the Fourier coefficients. The sinusoids specified by Fourier analysis are not time-bound; in effect, they oscillate forever. Wavelet analysis also decomposes a time-varying signal into simpler elements, i.e., wavelets, but a wavelet—unlike a Fourier sinusoid—is localized in time, typically lasting only a few cycles. Wavelet transforms represent a source signal as a sum of wavelets with different locations (in the time domain) and scales. The wavelet coefficients essentially quantify the contributions of the wavelets at these locations and scales. By using small, time-bound signals as building blocks, wavelet analysis can represent certain types of source signals (particularly those dominated by transient behavior or discontinuities) more efficiently. In the present context, the Fourier transform and/or wavelet coefficients from the original data are used to represent that data discretely, can also be directly included in the input data in order to avoid losing information that they represent.

Figure 3:
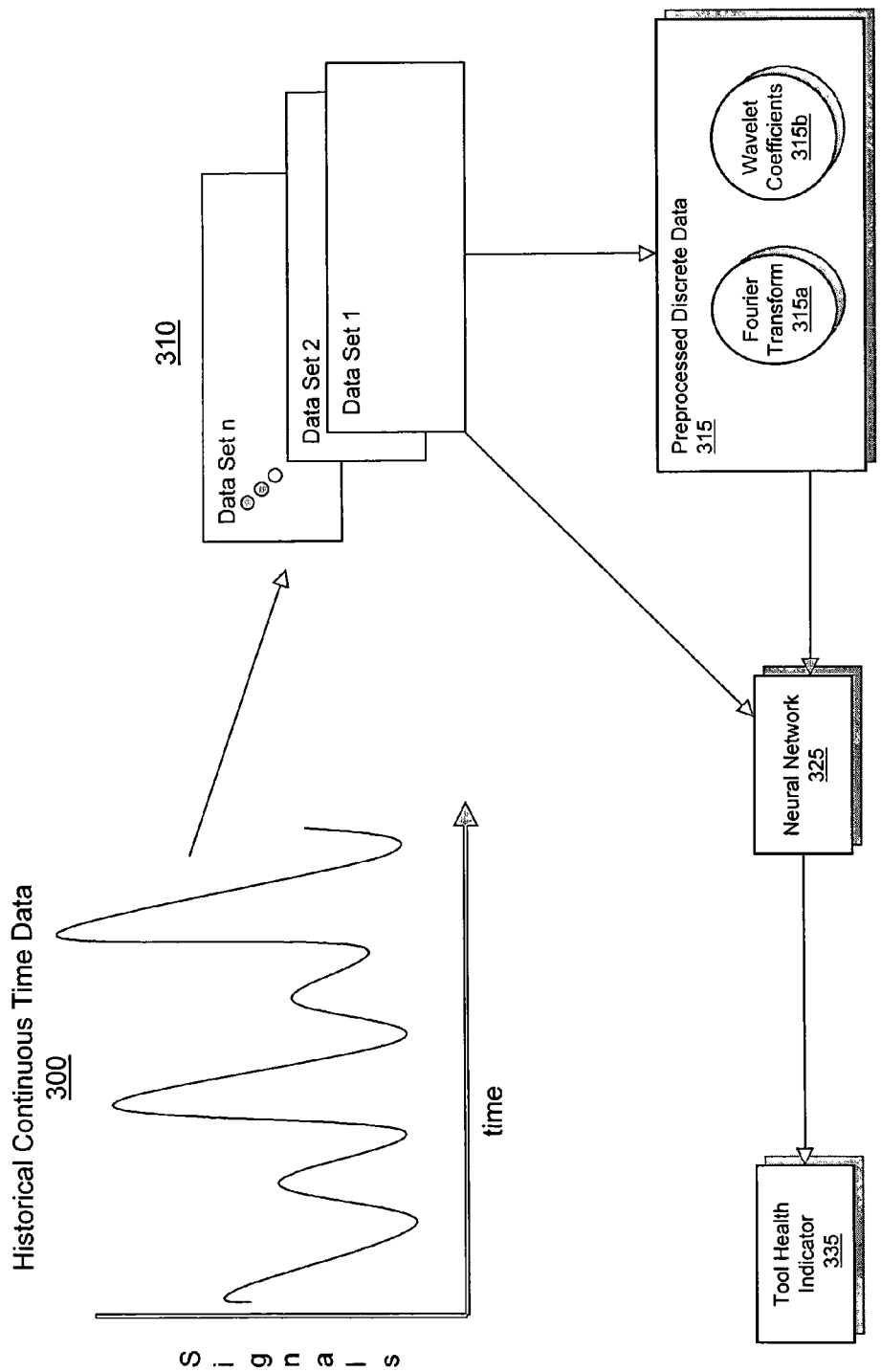
FIG. 3 is a timeline illustrating various embodiments of prediction of tool health according to the present invention.
Figure 4:
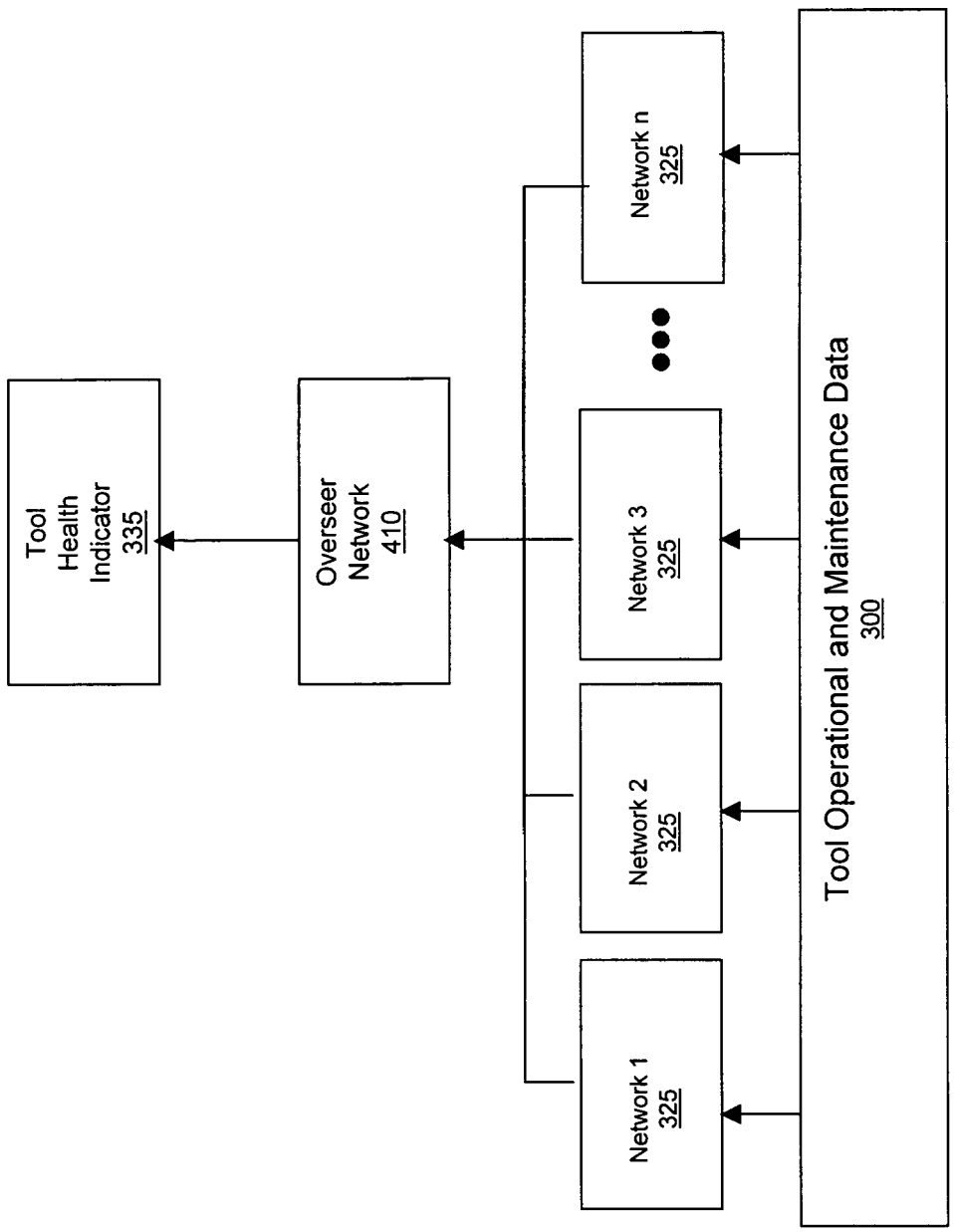
FIG. 4 is block diagram illustrating one embodiment of prediction of tool health using an overseer network according to the present invention.

Referring to FIG. 3, historical continuous data 300 can be broken into isolated, time-bounded data sets 310 using the approach described above. The continuous data can then be represented in discrete form 315 by utilizing one or more transforms, such as a Fourier transform 315a, wavelet analysis 315b, or other similar approach to representing continuous data 310 as discrete, time bounded data. The discrete data 315 can then be used as either exclusive input into a neural network 325, or in some embodiments, in conjunction with the time-bounded continuous datasets 310 to produce one or more tool health indicators 335.

The map between tool operational and maintenance data and tool health indicators is preferably determined by training a nonlinear regression model against measured operational and/or maintenance data and overall tool health. The operational and maintenance metrics for each tool serve as inputs to a nonlinear regression model. The output for the nonlinear regression is, for example, the tool health indicator at some future time. The nonlinear regression model is preferably trained by comparing tool health indicators based on measured tool operational and maintenance metrics with the actual tool health at a future time (e.g., as described above). The difference between the calculated tool health indicators and the actual tool health, or the error, can be used to compute the corrections to the adjustable parameters in the regression model. If the regression model is a neural network, these adjustable parameters are the connection weights between the layers of the neurons of the network. An "input vector" to the neural network is a set of values for parameters upon which the neural network has been trained.

In a preferred embodiment, a three-layer neural network model and training is as follows. The output of the neural network, vector r, is given by $$r_k = \sum_j \left[ W_{jk} \cdot \tanh\left( \sum_i W_{ij} \cdot x_i \right) \right].$$   Eq. (3)

This equation states that the $i^{th}$ element of the input vector x is multiplied by the connection weights $W_{ij}$. This product is then the argument for a hyperbolic tangent function, which results in another vector. This resulting vector is multiplied by another set of connection weights $W_{jk}$. The subscript i spans the input space (i.e., time-series data). The subscript j spans the space of hidden nodes, and the subscript k spans the output space (i.e., tool health predictive values). The connection weights are elements of matrix W, and are chosen to minimize the mathematical cost, for example, by gradient search of the error space. The cost function for the minimization of the output response error is given by $$C = \left[ \sum_j (t-r)^2 \right]^{\frac{1}{2}} + \gamma \|W\|^2$$   Eq. (4)

The first term represents the root-mean-square ("RMS") error between the target t and the output r. The second term is a constraint that minimizes the magnitude of the connection weight W. If $\gamma$ (called the regularization coefficient) is large, it will force the weights to take on small magnitude values. The coefficient $\gamma$ thus acts as an adjustable parameter for the desired degree of non-linearity in the model.

In some embodiments, the input data can be partitioned into smaller data sets, or modules, which in turn can produce potentially shorter input vectors. Modules can be based, for example, on the physics of the process, or it can come from insights of input data from pre-analysis. Pre-processed results of input data, such as Fourier transform and/or wavelets coefficients, can also serve as input modules. Cross-module interaction should be minimized to the extent possible. Referring to FIG. 3, the outputs of different combinations of modules may serve as inputs to intermediate networks 325. Each of the intermediate networks can receive, for example, one or more sets of related inputs such as stage 1 temperature, stage 2 temperature, pump regeneration information, elapsed time since the last regeneration, and/or Fourier transform coefficients. For each intermediate network, the input dimension is much smaller compared to the dimension of the total inputs to all the modules. The intermediate networks also serve as filters because if a module contributes more to the results, the intermediate network will have a higher accuracy compared to intermediate networks receiving inputs from modules contributing little to the result. Therefore, the overall input dimension can be further reduced by selecting only the intermediate networks with high accuracy to feed into the next stage, namely, an overseer network 410 that receives as inputs the outputs from the intermediate networks 325 to obtain an overall tool health indicator 335.

A further aspect of the embodiment described above, the output from the overseer network 410 can be smoothed to reduce noise using a 5-point moving average. The result of the smoothed output can then be used to determine if a replacement should be made.

Figure 5:
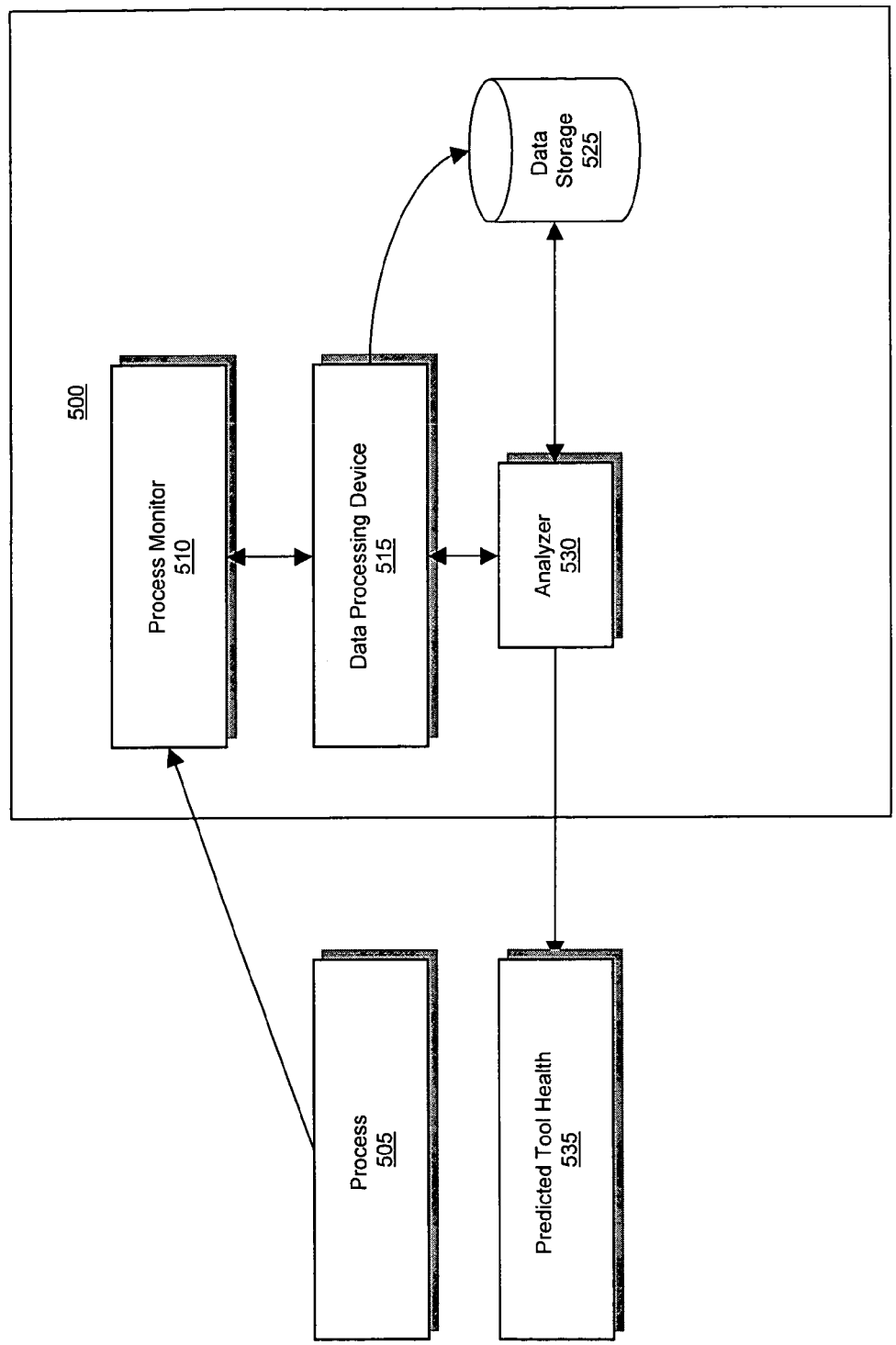
FIG. 5 is a schematic illustration of various embodiments of a system adapted to practice the methods of the present invention.

FIG. 5 schematically represents a hardware embodiment of the invention realized as a system 500 for predicting the tool health 535 of a tool operating within a process 505. The system 500 comprises a process monitor 510, a data processing device 515, a data storage device 525, and an analyzer 520.

The process monitor 510 receives input data representing the parameters indicative of the health of a tool operating within a process 505. The input data may reflect one or more aspects of the operation of the tool, such as tool pressure, etch rate, or power supply, and/or the environment in which the tool is operating, such as temperature, or other operational measurements. The process monitor 510 generally includes conventional ports and may also include circuitry for receiving time-varying analog data signals, and analog-to-digital conversion circuitry for digitizing the signals.

The process monitor 510 causes the input data to be transmitted to the data processing device 515. The data processing device 515, using techniques described above, partitions the input data into temporally displaced data sets with varying start times, end times, and in some embodiments time spans. The data processing device 515 may, in some embodiments, transmit the data sets to the data storage device 525 for future use.

The data processing device 515 causes the data sets to be transmitted to the analyzer 530. The analyzer 530, using techniques described above, determines a set of predictive values based on the dataset using non-linear regression methods such as, for example, a Fourier transform or a wavelet transform. In some embodiments, the analyzer 530 may implement the functionality of the present invention in hardware, using, for example, a computer chip implementing a Fast-Fourier Transform or other orthogonal transform. The analyzer 530 may receive signals in analog or digital form.

In other embodiments, the analyzer 530 may implement the functionality of the present invention as software on a general purpose computer. In addition, such a program may set aside portions of a computer's random access memory to provide control logic that affects one or more of the monitoring of tool health parameters, the measuring of operational variables, and the prediction of tool health. In such an embodiment, the program may be written in any one of a number of high-level languages, such as java, FORTRAN, PASCAL, C, C++, C#, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM. The analyzer 430, using at least one set of predictive values, then determines a tool health metric describing the health of the tool at some future time.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of predicting the health of a plurality of tools based on temporally ordered input data representing parameters indicative of tool health, the method comprising the steps of:
   using a sliding time window to partition the input data into temporally displaced data sets;
   creating intermediate neural networks for subsets of the data in the data sets;
   using non-linear regression to determine, based on the data sets, a set of predictive values relating to tool health at a future time; and
   determining a tool-health metric based on one or more of the predictive values.

2. The method of claim 1, wherein the tool-health metric is likelihood of tool failure.

3. The method of claim 1, wherein the data sets include only historical data.

4. The method of claim 1, wherein the data sets include discrete representations of continuous data.

5. The method of claim 4, wherein the data sets include Fourier coefficients.

6. The method of claim 4, wherein the data sets include wavelet coefficients.

7. The method of claim 1, wherein the data sets include operational data.

8. The method of claim 1, wherein the data sets include maintenance data.

9. The method of claim 1 further comprising creating an overseer neural network to accept outputs from the intermediate neural networks as input and to produce the tool heath metric as output.

10. The method of claim 9 further comprising using a moving average to smooth the output of the overseer network.

11. A system for predicting the health of a plurality of tools based on temporally ordered input data representing parameters indicative of tool health, the system comprising:
    a data module for receiving the input data; and
    an analysis module for (i) partitioning the input data into temporally displaced data sets, (ii) creating intermediate neural networks for subsets of the data in the data sets; (iii) using non-linear regression to determine a set of predictive values relating to tool health at a future time, and (iv) determining a tool-health metric based on one or more of the predictive values.

12. The system of claim 11, wherein the tool-health metric is likelihood of tool failure.

13. The system of claim 11, wherein the data sets include only historical data.

14. The system of claim 11, wherein the data sets include discrete representations of continuous data.

15. The system of claim 14, wherein the data sets include Fourier coefficients.

16. The system of claim 14, wherein the data sets include wavelet coefficients.

17. The system of claim 11, wherein the data sets include operational data.

18. The system of claim 11, wherein the data sets include maintenance data.

19. The system of claim 11 wherein the analyzer further creates an overseer neural network to accept outputs from the intermediate neural networks as input and to produce the tool heath metric as output.

20. The system of claim 19 wherein the analyzer uses a moving average to smooth the output of the overseer network.

21. A system for predicting the health of multiple tools based on temporally ordered input data representing parameters indicative of tool health, the system comprising:
    means for receiving input data;
    means for partitioning the input data into temporally displaced data sets;
    means for creating intermediate neural networks for subsets of the data in the data sets;
    means for using a non-linear regression model to determine a set of predictive values relating to tool health at a future time; and
    means for determining a tool-health metric based on the set of predictive values.

* * * * *